T. VAN ALLER.
ELECTRIC SOLDERING IRON.
APPLICATION FILED MAR. 25, 1908.
925,056.
Patented June 15, 1909.
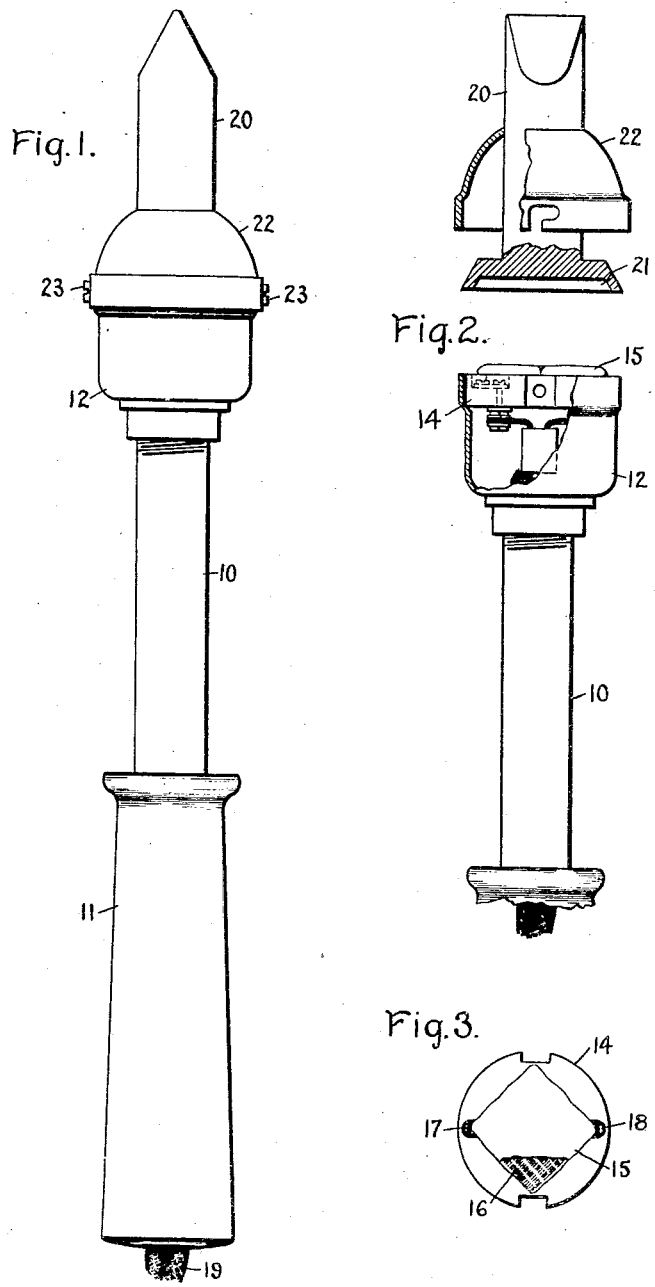
Witnesses:
Irving E. Steers.
Inventor
Tycho Van Aller,
by
Atty.

UNITED STATES PATENT OFFICE.

TYCHO VAN ALLER, OF SCHENECTADY, NEW YORK, ASSIGNOR TO GENERAL ELECTRIC COMPANY, A CORPORATION OF NEW YORK.

ELECTRIC SOLDERING-IRON.

No. 925,056.  Specification of Letters Patent.  Patented June 15, 1909.

Application filed March 25, 1908. Serial No. 423,124.

*To all whom it may concern:*

Be it known that I, TYCHO VAN ALLER, a subject of the King of Denmark, residing at Schenectady, New York, have invented certain new and useful Improvements in Electric Soldering-Irons, of which the following is a specification.

This invention relates to electrically-heated tools such as soldering irons and the like, and has for its object the provision of a device of this character which is extremely simple in construction and which can be brought to a working temperature rapidly and efficiently.

My invention relates more particularly to such tools as soldering irons in which an end or point of metal is brought up to a certain temperature.

One of the objects of my invention is to so construct a soldering iron that the tip as well as the heating unit may be easily removed and at the same time make an efficient heat-conducting joint between the unit and the tip.

Other objects of my invention will appear in the course of the following specification in which I have shown my invention embodied in concrete form for purposes of illustration.

Referring to the drawing, Figure 1 is an elevation of my soldering iron; Fig. 2 is a fragmentary view partly in section; Fig. 3 is a plan view of the heating unit.

Referring again to the drawing the tool comprises an elongated support consisting preferably of a pipe or tube 10 having a handle 11 secured to one end and a cup-shaped casing 12 secured to the other end. The casing 12 may be screwed to the pipe 10 as shown. This casing is preferably circular in form and provided at its outer end with a shoulder against which rests the base 14 of the heating unit. This base is in the form of a disk of insulating material, such as porcelain or the like, and upon the outer face of the disk is secured the heating coil 15. The particular form of this heating coil forms no part of my invention. I desire, however, to have the unit flat and to this end the wire is wound in the form of a helix 16 and carried back and forth and then embedded in cement or the like. The particular wire used in this unit forms no part of my invention although I prefer to use the inoxidizable high resistance wire described and claimed in the patent to John T. Dempster, 901,428. The terminals of this helix are at 17 and 18 and the conductors or flexible cords 19 are run through the support 10 and connect with these terminals. The soldering copper or tip 20 has its working end of the well known shape and its opposite end is preferably enlarged and cupped at 21 so as to fit over the unit 15 and cause an efficient thermal joint between the unit and the tip. A casing 22 fits over the tip and engages the enlarged portion. The two casings 12 and 22 are held together by screws 23 in a well known manner.

It will thus be seen that I have provided a soldering iron which is exceedingly simple in construction having few parts which are easily assembled. The arrangement is likewise efficient and the iron is light.

While I have shown and described my invention in connection with a specific arrangement and combination of parts, it should be understood that I do not limit my invention thereto except in so far as it is limited by the scope of the claims annexed hereto.

What I claim as new, and desire to secure by Letters Patent of the United States, is,—

1. A soldering iron comprising a flat electric heating unit, a soldering tip having one end in heat conductive relation with said unit throughout its area, and means for holding said parts together.

2. A soldering iron comprising a flat electric heating unit, a soldering tip having one end in heat-conductive relation with said unit, and a casing surrounding said unit and holding the parts in place.

3. A soldering iron comprising a tip having one end enlarged, a flat heating unit in heat-conductive relation with said enlargement, and means for holding said parts together.

4. A soldering iron comprising an electric heating unit, a separable soldering tip having one end in heat-conductive relation to said unit throughout its area, and means for holding said parts together.

5. A soldering iron comprising a flat electric heating unit, a separable soldering tip arranged in heat-conductive relation with said unit, and a casing surrounding said unit and holding the tip and unit together.

6. A soldering iron comprising a separable soldering tip having one end enlarged, a flat heating unit in heat-conductive relation with the said enlargement, and a casing surrounding said enlarged end and unit and holding said parts in place.

7. A soldering iron comprising an elongated support having a handle at one end and a flat heating unit at the other end arranged transversely of the support, terminals for said unit passing through the support, a soldering tip and means for securing the same in thermal contact with the unit.

8. A soldering iron comprising an elongated support having a handle at one end and a casing at the other, a flat heating unit mounted in said casing transversely of the support, terminals for said unit passing through the support, a soldering tip and means for securing the same in heat-conductive relation with the unit.

9. A soldering iron comprising an elongated support having a handle at one end and a casing at the other, a flat heating unit mounted in said casing, terminals for the unit passing through the support, a soldering tip having an enlarged end, and a casing engaging said large end and coöperating with said first casing to hold the tip and unit together.

In witness whereof I have hereunto set my hand this 24th day of March 1908.

TYCHO VAN ALLER.

Witnesses:
  BENJAMIN B. HULL,
  HELEN ORFORD.